(12) United States Patent
Karikomi (10) Patent No.: US 6,762,581 B2
(45) Date of Patent: Jul. 13, 2004

(54) CONTROL SYSTEM OF ELECTRIC MOTOR (75) Inventor: Takaaki Karikomi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/167,578

(22) Filed: Jun. 13, 2002

(65) Prior Publication Data
US 2002/0190672 A1 Dec. 19, 2002

(30) Foreign Application Priority Data
Jun. 14, 2001 (JP) ........................................ 2001-180524

(51) Int. Cl.$^7$ .............................................. H02P 5/408
(52) U.S. Cl. ...................... 318/800; 318/801; 318/139; 318/432; 318/798
(58) Field of Search ................................ 318/139, 254, 318/138, 439, 811, 812, 432, 800, 801, 802, 813, 827, 799, 727, 780, 798; 363/74, 95

(56) References Cited
U.S. PATENT DOCUMENTS

| | | | | |
|---|---|---|---|---|
| 5,475,293 A | * | 12/1995 | Sakai et al. | 318/802 |
| 5,990,657 A | * | 11/1999 | Masaki et al. | 318/811 |
| 6,037,741 A | * | 3/2000 | Yamada et al. | 318/721 |
| 6,194,865 B1 | * | 2/2001 | Mitsui et al. | 318/139 |
| 6,229,719 B1 | * | 5/2001 | Sakai et al. | 318/802 |
| 6,377,017 B2 | * | 4/2002 | Kondou et al. | 318/801 |

FOREIGN PATENT DOCUMENTS

| | | | | |
|---|---|---|---|---|
| JP | 03256587 A | * | 11/1991 | ........... H02P/5/408 |
| JP | 06070571 A | * | 3/1994 | ........... H02P/5/408 |
| JP | 07107772 A | * | 4/1995 | ............. H02P/6/06 |
| JP | 2000-32799 | | 1/2000 | |

* cited by examiner

*Primary Examiner*—Kimberly Lockett
*Assistant Examiner*—Eduardo Colon Santana
(74) *Attorney, Agent, or Firm*—McDermott Will & Emery LLP

(57) ABSTRACT

A control system of an electric motor powered by a battery comprises an inverter circuit that inverts a direct current fed from the battery to an alternating current fed to the electric motor; and an output controlling circuit that controls an output of the inverter circuit to adjust operation of the electric motor. The output controlling circuit includes a first section that detects a magnitude of output voltage of the battery; a second section that, based on the detected output voltage, derives an unloaded voltage that would be outputted from the battery when the battery is unloaded; a third section that, based on the unloaded voltage, looks up an appropriate current command from maps that store various current commands with respect to operation condition of the motor; and a fourth section that, based on the looked up current command, controls the output of the inverter circuit.

9 Claims, 4 Drawing Sheets

FIG.6

CONTROL SYSTEM OF ELECTRIC MOTOR

BACKGROUND OF INVENTION

1. Field of Invention

The present invention relates in general to control systems of electric motors and more particularly to control systems of a type that inverts direct current from a battery to alternating current to power an electric motor. More specifically, the present invention is concerned with a technique that effectively uses a direct current power source for powering an electric motor.

2. Description of Related Art

Hitherto, various control systems of electric motors have been proposed and put into practical use. One of them is described in Laid-Open Japanese Patent Application (Tokkai) 2000-32799. In the control system of this publication, for various different voltages from a battery, there are provided respective current command maps listing high-efficiency data in advance by torque commands and rotation speeds of the motor, and according to the voltage actually applied to the motor, an optimum one of the current command maps is selected. With this, even if a battery voltage is subjected to a certain fluctuation, a maximum terminal voltage is available to the motor and thus, the battery power is effectively used.

SUMMARY OF INVENTION

In order to clarify the task of the present invention, the control system disclosed by the above-mentioned publication will be briefly discussed in the following.

That is, under a normal condition of the control system, an optimum current command map is selected in accordance with the battery voltage to derive a current command. However, in case of a marked change of the motor torque, that is, in case wherein fluctuation of the current command becomes marked, the battery voltage becomes varied temporarily due to output fluctuation of the motor, so that the voltage is subjected to a voltage drop prior to switching of the current command maps. In this case, the control system tends to lower the control accuracy. If, for suppressing lowering of control accuracy, margins are provided to the current command maps, working efficiency of the motor becomes lowered inevitably.

If a feedback cycle is made shorter, that is, if the interval at which torque command and rotation speed data of the motor are issued is made shorter, the fluctuation of battery voltage can be easily tracked or controlled. However, this measure needs addition of a noise cut filter for removing noises which are inevitably produced when monitoring the battery voltage, and thus the measure brings about lowering in tracking ability. In addition to this, the load of the control system becomes larger.

Accordingly, an object of the present invention is to provide a control system of an electric motor, which is free of the above-mentioned defects.

According to a first aspect of the present invention, there is provided a control system of an electric motor powered by a battery, which comprises an inverter circuit that inverts a direct current fed from the battery to an alternating current fed to the electric motor; and an output controlling circuit that controls an output of the inverter circuit to adjust operation of the electric motor, the output controlling circuit including a first section that detects a magnitude of output voltage of the battery; a second section that, based on the detected output voltage, derives an unloaded voltage that would be outputted from the battery when the battery is unloaded; a third section that, based on the unloaded voltage, looks up an appropriate current command from maps that store various current commands with respect to operation condition of the motor; and a fourth section that, based on the looked up current command, controls the output of the inverter circuit.

According to a second aspect of the present invention, there is provided a control system of an electric motor powered by a battery, which comprises an inverter circuit that inverts a direct current fed from the battery to an alternating current fed to the electric motor; and an output controlling circuit that controls an output of the inverter circuit to adjust operation of the electric motor, the output controlling circuit including a voltage detecting section that detects a magnitude of an output voltage of the battery; an unloaded voltage estimation section that, based on the detected output voltage, estimates an unloaded voltage that would be outputted from the battery when the battery is unloaded; a map storing section that stores a plurality of maps for various unloaded voltages, each map showing a relationship between a torque command, a rotation speed of the motor and a current command, the map storing section issuing a corresponding current command when receiving the unloaded voltage from the unloaded voltage estimation section; and a current control section that controls the output of the inverter circuit in accordance with the appropriate current command from the map storing section.

According to a third aspect of the present invention, there is provided a control system of an electric motor powered by a battery, which comprises an inverter circuit that inverts a direct current fed from the battery to an alternating current fed to the electric motor; and an output controlling circuit that controls an output of the inverter circuit to adjust operation of the electric motor, the output controlling circuit including a voltage detecting section that detects a magnitude of an output voltage of the battery; an unloaded voltage estimation section that, based on the detected output voltage, estimates an unloaded voltage that would be outputted from the battery when the battery is unloaded; a position sensor that detects an angular position and a rotation speed of a rotor of the motor; a current sensor that detects a condition of current outputted from the inverter circuit; a host controller that issues a torque command; a map storing section that stores a plurality of maps for various unloaded voltages, each map showing a relationship between the torque command, the rotation speed of the electric motor and a current command, the map storing section issuing a corresponding current command when receiving the unloaded voltage from the unloaded voltage estimation section; and a current control section that controls the output of the inverter circuit in accordance with the corresponding current command from the map storing section, the detected angular position and rotation speed of the rotor of the electric motor from the position sensor and the detected condition of current from the current sensor.

DETAILED DESCRIPTION OF EMBODIMENTS

In the following, two embodiments 100 and 200 of the present invention will be described with reference to the accompanying drawings.

Throughout the description, substantially same elements and parts are denoted by the same numerals and repeated description of them is omitted for simplification of explanation.

Figure 1:
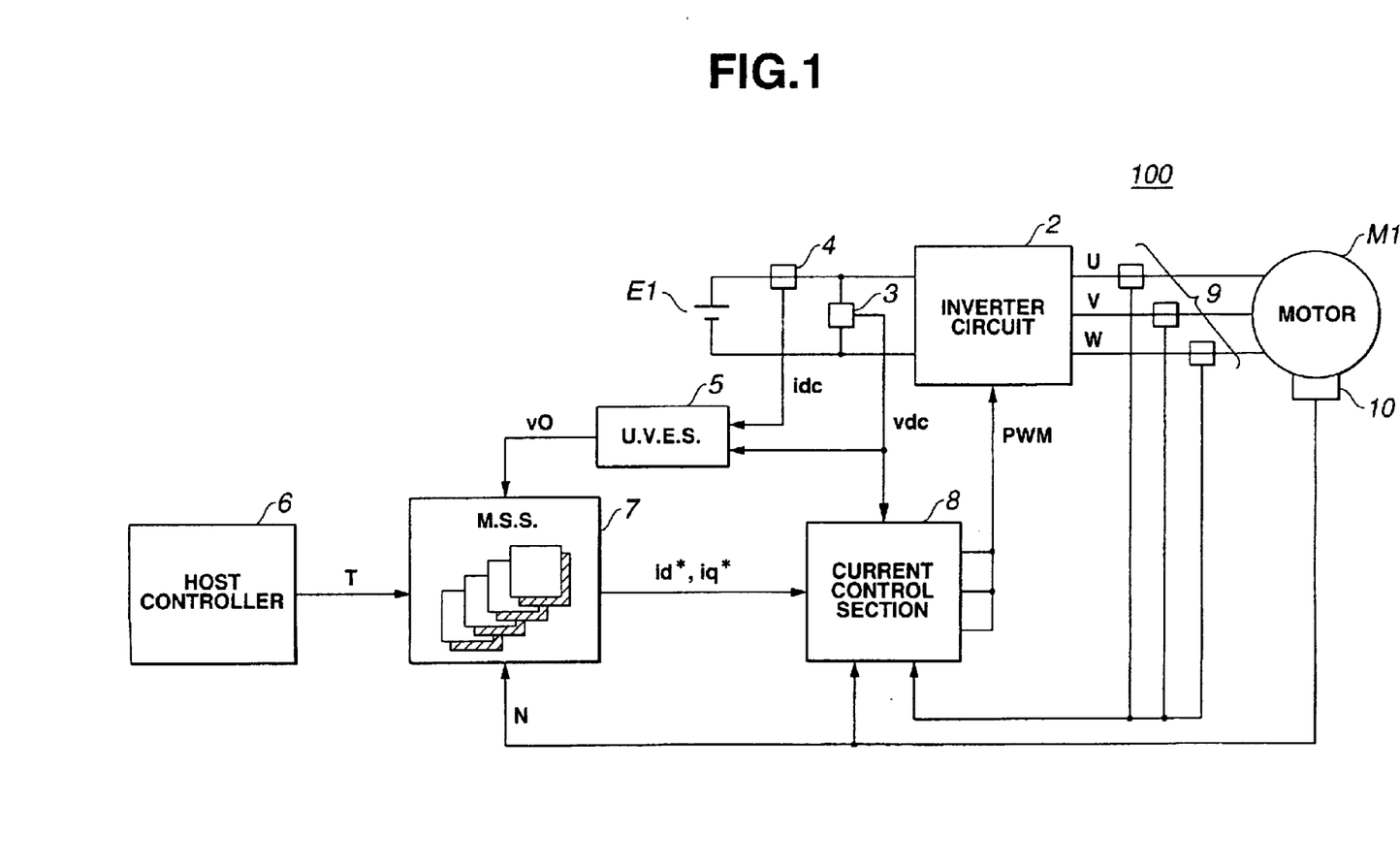
FIG. 1 is a block diagram showing a control system which is a first embodiment of the present invention.

Referring to FIG. 1, there is schematically shown a control system 100 of an electric motor "M1", which is a first embodiment of the present invention.

The motor "M1" is of a synchronous type. That is, the control system 100 is arranged to control operation of the synchronous motor "M1".

The control system 100 comprises an inverter circuit 2 that inverts or converts a direct current from a battery "E1" to a three-phase alternating current which is fed to synchronous motor "M1", a voltmeter 3 that detects a magnitude "vdc" of an output voltage of battery "E1", and an ammeter 4 that detects a magnitude "idc" of output current from battery "E1".

Furthermore, the control system 100 comprises an unloaded voltage estimation section (or U. V. E. S) 5 that, based on the detected voltage "vdc" from voltmeter 3 and the detected current "idc" from ammeter 4, estimates an output voltage "v0" that would be outputted from battery "E1" when battery is unloaded, a current sensor 9 that detects a magnitude of current flowing in each phase (viz., u-phase, v-phase or w-phase) of the three-phase alternating current led to synchronous motor "M1" and a position sensor 10 that detects a rotor position and rotor speed of motor "M1".

The control system 100 further comprises a host controller 6, a map storing section (or M. S. S.) 7 and a current control section 8. That is, the host controller 6 issues a torque command "T". Based on torque command "T" from the host controller 6, output voltage "v0" from unloaded voltage estimation section (or U. V. E. S.) 5 and the data "N" (viz., rotor position and rotor speed) from the position sensor 10, the map storing section (or M. S. S.) 7 selects an optimum current command map that is actually used for deriving an after-mentioned current command "id*" and "iq*" which includes a d-axis current command and a q-axis current command.

Figure 2:
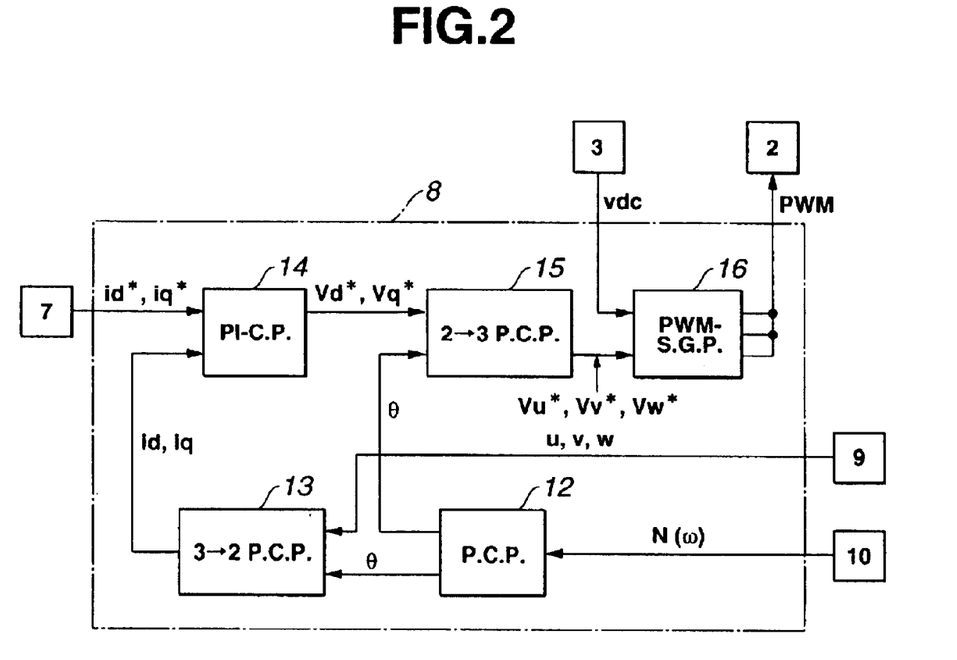
FIG. 2 is a block diagram showing a current control section employed in the control system of the first embodiment.

FIG. 2 shows the detail of current control section 8. As is seen from this drawing, current control section 8 comprises a phase calculating part (or P. C. P) 12 that, based on the data "N" from position sensor 10, calculates or estimates a phase angle "θ" of the rotor of motor "M1", and a 3-2 phase converting part (or 3-2 P. C. P.) 13 that, based on phase angle "θ" and the detected three-phase current (viz., u-phase, v-phase and w-phase) from the current sensor 9, converts the three-phase alternating current into a two-phase measured current "id" and "iq".

The current control section 8 further comprises a PWM signal generating part (or PWM S. G. P.) 16 that, based on the detected output voltage "vdc" from voltmeter 3 and voltage command "Vu*", "Vv*" and "Vw*" issued from an after-mentioned 2-3 phase converting part (or 2-3 P. C. P.) 15, generates a PWM signal having a desired duty ratio and feeds this PWM signal to inverter circuit 2, and a PI controlling part (or PI C. P.) 14 that, based on current commands "id*" and "iq*" outputted from map storing section 7 and measured current "id" and "iq" derived by 3-2 phase converting part 13, derives two phase voltage commands "Vd*" and "Vq*".

Based on two phase voltage commands "Vd*" and "Vq*" outputted from PI controlling part 14 and phase angle "θ" derived by phase calculating part 12, the 2-3 phase converting part 15 carries out a 2-3 phase conversion to derive the three phase voltage command "Vu*", "Vv*" and "Vw*" and feeds this voltage command to PWM signal generating part (or PWM S. G. P.) 16.

Figure 3:
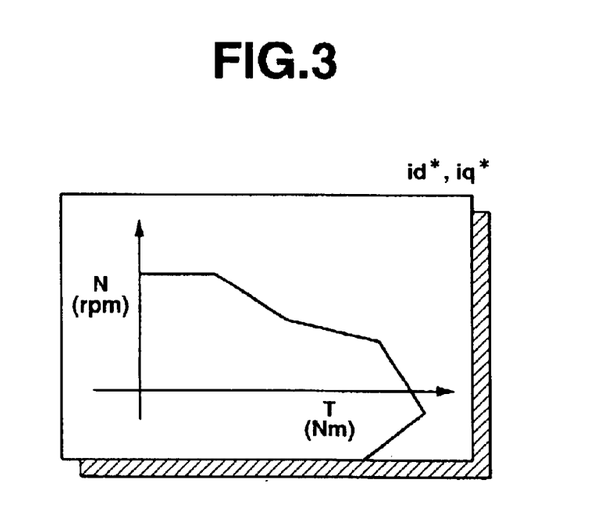
FIG. 3 shows current command maps employed in the control system of the first embodiment.

FIG. 3 shows schematically current command maps installed or memorized in map storing section 7. As shown, each map indicates both d-axis current command "id*" and q-axis current command "iq*" with respect to torque command "T" (Nm) outputted from host controller 6 (which is shown in the x-axis) and rotation speed "N" (rpm) of motor "M1" (which is shown in the y-axis). The maps are provided for every unloaded voltages of battery "E1".

Accordingly, once an unloaded voltage "v0" of battery "E1", a torque command "T" and a rotation speed "N" of motor "M1" are provided, the map storing section 7 looks up appropriate or optimum current commands "id*" and "iq*" from a selected map.

In the following, operation of control system 100 of the above-mentioned first embodiment will described in detail.

When, for starting synchronous motor "M1", the inverter circuit 2 is energized, the voltage of battery "E1" is applied to inverter circuit 2. Upon this, based on PWM command signal fed from current control section 8, the inverter circuit 2 generates a three phase alternating voltage. With this, synchronous motor "M1" is energized to run.

During running of motor "M1", output voltage "vdc" and output current "idc" from battery "E1" are detected by voltmeter 3 and ammeter 4. The detected voltage "vdc" and current "idc" are led into unloaded voltage estimation section (or U. V. E. S.) 5. In this section 5, based on the detected data, a process is carried out to estimate or derive an output voltage "v0" which would be provided when battery "E1" is under no load, that is, when output terminals of battery "E1" open the circuit.

For this estimation, the following various methods are usable.

Method-1

By using an equation (1), a charged current amount "AH" (ampere-hour) is derived from output current "idc".

$$AH = (1/3600) \int idc \, dt \tag{1}$$

Then, using the following equation (2), a depth of discharge "DOD" (%) is derived.

$$DOD = (1 - (AH/AH0)) \times 100 \tag{2}$$

wherein,

AH0: full charged current amount of battery "E1".

Then, using the following equation (3), the unloaded output voltage "v0" is derived.

$$v0 = f0(DOD) \tag{3}$$

That is, the unloaded voltage "v0" of battery "E1" is represented as a function "f0" of depth of discharge "DOD".

Method-2

By using an equation (4), a charged electric power amount "WH" (watt-hour) is derived from output current "idc" and output voltage "vdc".

$$WH = (1/3600) \int vdc \times idc \, dt \qquad (4)$$

Then, by using the following equation (5), a depth of discharge "DOD" (%) is derived.

$$DOD = (1 - (WH/WH0)) \times 100 \qquad (5)$$

wherein,

WH0: full charged electric power amount of battery "E1".

Then, using the above-mentioned equation (3), the unloaded output voltage "v0" is derived.

Method-3

Between unloaded voltage "v0", direct current "idc", direct current voltage "vdc" and internal resistance "Ri" of battery "E1", the following relation (6) is established.

$$v0 - Ri \times idc = vdc \qquad (6)$$

When direct current "idc" is 0 (zero), unloaded voltage "v0" becomes direct current voltage "vdc". Thus, if direct current voltage "vdc" is detected in timing with "idc=0 (zero)", the detected voltage must indicate the unloaded voltage "v0".

If, like in case of lithium ion battery, the internal resistance "Ri" of battery "E1" is fixed, the equation (6) shows the unloaded voltage "v0" when direct current voltage "vdc" and direct current "idc" are provided.

Method-4

The internal resistance "Ri" of battery "E1" is represented as a function "f2" of depth of discharge "DOD", that is, $$Ri = f2(DOD) \qquad (7)$$

Accordingly, based on the depth of discharge "DOD" derived by the above-mentioned Mothod-1 or Method-2, the internal resistance "Ri" of battery "E1" is provided. Thus, when the internal resistance "Ri" thus derived is applied to the above-mentioned equation (6), the unloaded voltage "v0" can be derived.

Method-5

As is mentioned hereinabove, the unloaded voltage "v0" of battery "E1" can be derived from depth of discharge "DOD" (that is, v0=f0(DOD)), and the internal resistance "Ri" of battery "E1" can be also derived from depth of discharge "DOD" (that is, Ri=f2(DOD)). Accordingly, the above equation (6) can be rewritten in the following equation (8), that is:

$$f0(DOD) - f2(DOD) \times idc = vdc \qquad (8)$$

Accordingly, if direct current "idc" and direct current voltage "vdc" are actually given, the equation (8) can be solved. That is, the unloaded voltage "v0" of battery "E1" is derived.

Once the unloaded voltage "v0" of battery "E1" is obtained from the above-mentioned methods, the voltage "v0" is led to map storing section 7. Based on torque command "T" issued from host controller 6, rotation speed "N" of motor "M1" issued from position sensor 10 and unloaded voltage "v0" estimated by unloaded voltage estimation section 5, the map storing section 7 selects one of the current command maps that indicates appropriate d-axis current command "id*" and q-axis current command "iq*".

These current commands "id*" and "iq*" are led to PI controlling part 14 of current control section 8 (see FIG. 2).

At phase calculating part (or P. C. P) 12 of current control section 8, phase angle "θ" of the rotor of motor "M1" is derived based on an angular velocity "w" of motor "M1". In 3-2 phase converting part 13, a two-phase measured current "id" and "iq" is calculated based on the phase angle "θ" and detected current from the current sensor 9. Based on the two-phase measured current "id" and "iq" provided by 3-2 phase converting part 13 and current commands "id*" and "iq*" provided by map storing section 7, the PI controlling part 14 derives two phase voltage commands "Vd*" and "Vq*".

Base on the two phase voltage commands "Vd*" and "Vq*" and phase angle "θ" derived by phase calculating part 12, the 2-3 phase converting part 15 derives three phase voltage commands "Vu*", "Vv*" and "Vw*", and based on these three voltage commands "Vu*", "Vv*" and "Vw*", the PWM signal generating part 16 sets a desired duty ratio which is fed to inverter circuit 2 (see FIG. 1). Based on this duty ratio, inverter circuit 2 outputs a three phase alternating current voltage to synchronous motor "M1".

As will be seen from the above, in the first embodiment 100, the synchronous motor "M1" is driven with a duty ratio in accordance with a charged electric power of battery "E1". This means that the charged electric power of battery "E1" can be effectively consumed.

In this first embodiment 100, the battery voltage "v0" at the time when battery "E1" is unloaded is estimated by the unloaded voltage estimation section 5, and based on the voltage "v0", the current commands "id*" and "iq*" are derived by the map storing section 7. Accordingly, even when, under power feeding from battery "E1", the voltage makes a shape change, exact current commands are expected, and thus, stable operation of synchronous motor "M1" is constantly carried out.

As known, depth of discharge "DOD" has a so-called one-to-one correspondence to unloaded output voltage "v0". Thus, if desired, in place of the maps provided for every unloaded voltages, maps provided for every depths of discharge "DOD" may be used for deriving current commands "id*" and "iq*".

Figure 4:
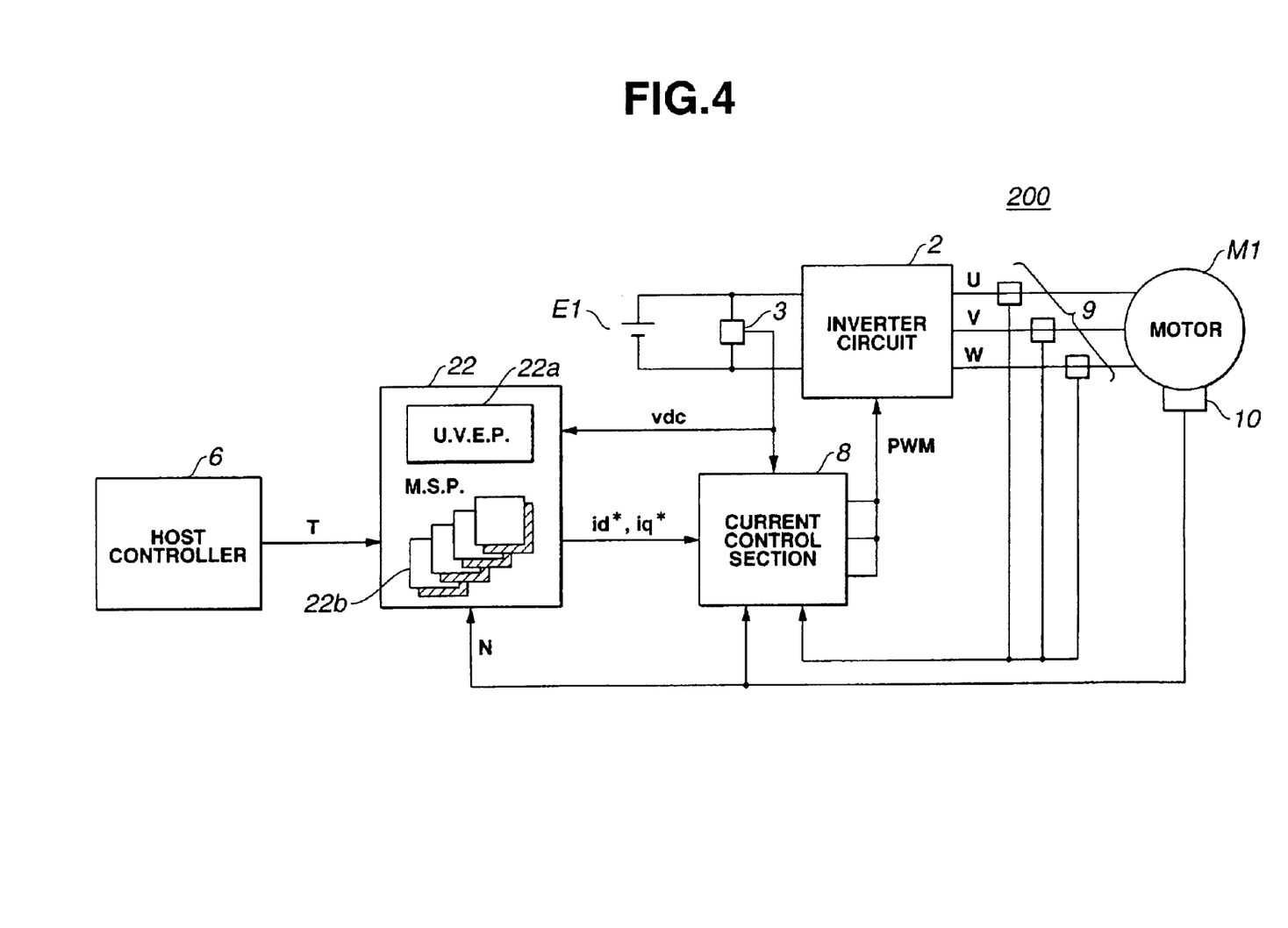
FIG. 4 is a block diagram similar to FIG. 1, but showing a control system which is a second embodiment of the present invention.

Referring to FIG. 4, there is shown schematically a control system 200 of an electric motor "M1", which is a second embodiment of the present invention.

Since the second embodiment 200 is similar to the above-mentioned first embodiment 100, only portions or parts which are different from those of the first embodiment 100 will be described in detail in the following.

As shown, in the second embodiment 200, there is employed a current command setting section 22 which includes an unloaded voltage estimation part (or U. V. E. P.) 22a and a map storing part (or M. S. P.) 22b. However, in the second embodiment 200, there is no means corresponding to ammeter 4 employed in the first embodiment 100.

Figure 5:
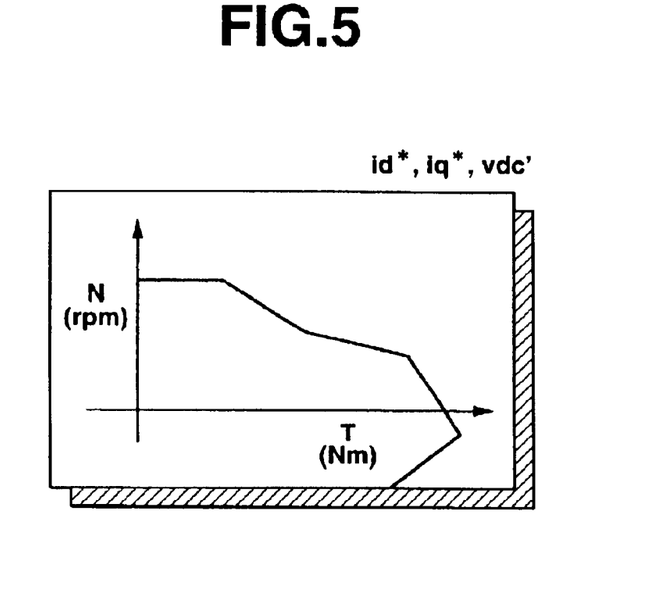
FIG. 5 shows current command maps employed in the control system of the second embodiment.

FIG. 5 shows schematically current command maps installed or memorized in map storing part 22b of current command setting section 22. As shown, each map indicates d-axis current command "id*", q-axis current command "iq*" and direct current voltage "vdc'" with respect to torque command "T" (Nm) outputted from host controller 6 (which is shown in the x-axis) and rotation speed "N" (rpm) of motor "M1" (which is shown in the y-axis). The direct current voltage "vdc'" corresponds to output of battery "E1". The maps are provided for every unloaded voltages of battery "E1".

Accordingly, once the direct current voltage "vdc" detected by voltmeter 3 is given, direct current is derived based on the detected voltage "vdc", and then based on the derived direct current and detected voltage "vdc", the unloaded voltage "v0" of battery "E1" is estimated like in the above-mentioned first embodiment 100. Then, based on the estimated unloaded voltage "v0", torque command "T" and rotation speed "N" of motor "M1", appropriate current commands "id*" and "iq*" are obtained.

For deriving current commands, the following various methods are usable.

Method-6

As is described hereinabove, the map storing part 22b of current command setting section 22 can provide current commands "id*" and "iq*" and direct current voltage "vdc'" with respect to torque command "T" and rotation speed "N" (rpm) of motor "M1".

The unloaded voltage "v0" and the voltage "vdc" measured by voltmeter 3 have the following connection.

$$v0\{(k+1)T\}=f3\{vdc(kT)\} \quad (9)$$

wherein:
  k: control loop time capable of providing rotation speed "N" and torque command "T".

As is seen from equation (9), unloaded voltage "v0" and voltage "vdc" have a so-called one-to-one connection, and thus, the unloaded voltage "v0" is obtained from the equation (9).

Figure 6:
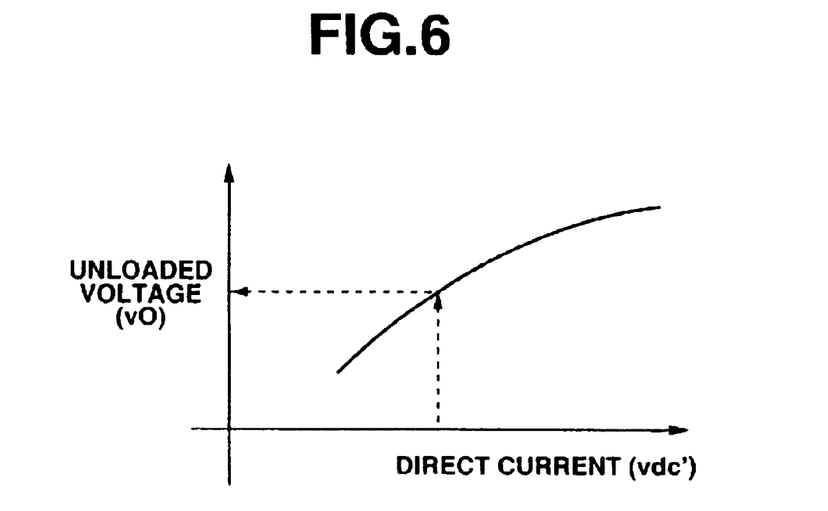
FIG. 6 is a characteristic curve showing the relationship between a direct current and an unloaded voltage.

That is, for example, when receiving a signal of 1000 rpm as rotation speed "N" and a signal of 50 Nm as torque command "T", map storing part 22b of current command setting section 22 selects an appropriate one from the maps of FIG. 5 and looks up a direct current voltage "vdc'" that corresponds to 1000 rpm of rotation speed "N" and 50 Nm of torque command. Then, as is seen from the graph of FIG. 6, using a certain characteristic curve, unloaded voltage estimation part 22a of current command setting section 22 looks up an unloaded voltage "v0" corresponding to direct current voltage "vdc'".

Method-7

Unloaded voltage "v0", voltage "vdc" detected by voltmeter 3 and direct current voltage "vdc'" stored in the map have the following connection.

$$v0\{(k+1)T\}=v0(kT)-K\times\{vdc'(kT)-vdc(kT)\} \quad (10)$$

wherein:
  k: control loop time capable of providing rotation speed "N" and torque command "T",
  K: feedback constant.

In the following, equation (10) will be described. For ease of understanding, description will be commenced with respect to a condition wherein a certain map of unloaded voltage of "v0" (kT), for example map of 100V is used, and certain rotation speed "N" and certain torque command "T" are given.

If, under this condition, detected voltage "vdc" from voltmeter 3 coincides with looked up voltage "vdc'" (for example, 95V) in the map, the above equation (10) provides the following equation (11).

$$v0\{(k+1)T\}=v0(kT) \quad (11)$$

That is, in this case, the unloaded voltage provided at this time (viz., unloaded voltage provided at a time corresponding to "k") is used next time (viz., unloaded voltage provided at a time corresponding to "k+1"), too.

While, if detected voltage "vdc" (kT) from voltmeter 3 shows a dropped value, for example, 94V, the value of unloaded voltage "v0" is somewhat lowered, and thus the value of "v0{(k+1)T}" is lowered to for example 99V. While, if detected voltage "vdc" (kT) shows an increased value, for example 96V, the value of unloaded voltage "v0" is somewhat increased, and thus the value of "v0{(k+1)T}" is increased to for example 101V. Like this, the unloaded voltage "v0" can be precisely estimated.

In both Method-6 and Method-7, the control loop is achieved with a delayed cycle. This is because the unloaded voltage does not change instantly.

Based on unloaded voltage "v0" derived by Method-6 or Method-7, current commands "id*" and "iq*" are derived. Subsequent process is substantially the same as that in the above-mentioned first embodiment 100.

As is mentioned hereinabove, in the second embodiment 200, the current commands "id*" and "iq*" are derived based on voltage "vdc" detected by voltmeter 3 that detects output voltage of battery "E1". Accordingly, in the second embodiment 200, there is no need of using an ammeter 4 that is used in the first embodiment 100.

The entire contents of Japanese Patent Application 2001-180524 filed Jun. 14, 2001 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A control system of an electric motor powered by a battery, comprising:
    an inverter circuit that inverts a direct current fed from said battery to an alternating current fed to said electric motor; and
    an output controlling circuit that controls an output of said inverter circuit to adjust operation of said electric motor, said output controlling circuit including:
        a first section that detects a magnitude of output voltage of said battery;
        a second section that, based on the detected output voltage, derives an unloaded voltage that would be outputted from said battery when said battery is unloaded;
        a third section that, based on said unloaded voltage, looks up an appropriate current command from maps that store various current commands with respect to operation condition of the motor; and
        a fourth section that, based on said current command, controls the output of said inverter circuit.

2. A control system of an electric motor powered by a battery, comprising:
    an inverter circuit that inverts a direct current fed from said battery to an alternating current fed to said electric motor; and
    an output controlling circuit that controls an output of said inverter circuit to adjust operation of said electric motor, said output controlling circuit including:
        a voltage detecting section that detects a magnitude of an output voltage of said battery;
        an unloaded voltage estimation section that, based on the detected output voltage, estimates an unloaded voltage that would be outputted from said battery when said battery is unloaded;
        a map storing section that stores a plurality of maps for various unloaded voltages, each map showing a relationship between a torque command, a rotation speed of said motor and a current command, said map storing section issuing a corresponding current command when receiving the unloaded voltage from said unloaded voltage estimation section; and a current control section that controls the output of said inverter circuit in accordance with the appropriate current command from said map storing section.

3. The control system as claimed in claim 2, in which said unloaded voltage estimation section is configured to carry out:

determining an output current of said battery, based on the detected output voltage from said voltage detecting section, said torque command and the detected rotation speed of the electric motor; and estimating the unloaded voltage, based on said output current and said detected output voltage.

4. The control system as claimed in claim 2, further comprising a current detecting section that detects a magnitude of output current from said battery, said unloaded voltage estimation section estimating said unloaded voltage, based on the detected output voltage from said voltage detecting section and the detected output current from said current detecting section.

5. A control system of an electric motor powered by a battery, comprising:

an inverter circuit that inverts a direct current fed from said battery to an alternating current fed to said electric motor;

an output controlling circuit that controls an output of said inverter circuit to adjust operation of said electric motor, said output controlling circuit including:
a first section that detects a magnitude of output voltage of said battery,
a second section that, based on the detected output voltage, derives an unloaded voltage that would be outputted from said battery when said battery is unloaded,
a third section that, based on said unloaded voltage, looks up an appropriate current command from maps that store various current commands with respect to operation condition of the motor, and
a fourth section that, based on said current command, controls the output of said inverter circuit; and a current detecting section that detects a magnitude of output current from said battery, said unloaded voltage estimation section estimating said unloaded voltage, based on the detected output voltage from said voltage detecting section and the detected output current from said current detecting section, wherein said unloaded voltage estimating section is configured to carry out:

integrating the current from said current detecting section with respect to a time thereby to derive a charged current amount;

calculating a depth of discharge, based on a rate between said charged current amount and a full charged current amount of said battery; and estimating the unloaded voltage of the battery, based on said depth of discharge.

6. A control system of an electric motor powered by a battery, comprising:

an inverter circuit that inverts a direct current fed from said battery to an alternating current fed to said electric motor;

an output controlling circuit that controls an output of said inverter circuit to adjust operation of said electric motor, said output controlling circuit including:
a first section that detects a magnitude of output voltage of said battery,
a second section that, based on the detected output voltage, derives an unloaded voltage that would be outputted from said battery when said battery is unloaded,
a third sectino that, based on said unloaded voltage, looks up an appropriate current command from maps that store various current commands with respect to operation condition of the motor, and
a fourth section that, based on said current command, controls the output of said inverter circuit; and a current detecting section that detects a magnitude of output current from said battery, said unloaded voltage estimation section estimating said unloaded voltage, based on the detected output voltage from said voltage detecting section and the detected output current from said current detecting system, wherein said unloaded voltage estimating section is configured to carry out:

multiplying the detected current from said current detecting section and the detected voltage from said voltage detecting section together thereby to derive a product;

integrating the product with respect to a time thereby to derive a charged current amount;

calculating a depth of discharge, based on a rate between said charged current amount and a full charged current amount of said battery; and estimating the unloaded voltage of the battery, based on said depth of discharge.

7. A control system of an electric motor powered by a battery, comprising:

an inverter circuit that inverts a direct current fed from said battery to an alternating current fed to said electric motor;

an output controlling circuit that controls an output of said inverter circuit to adjust operation of said electric motor, said output controlling circuit including:
a first section that detects a magnitude of output voltage of said battery,
a second section that, based on the detected output voltage, derives an unloaded voltage that would be outputted from said battery when said battery is unloaded,
a third section that, based on said unloaded voltage, looks up an appropriate current command from maps that store various current commands with respect to operation condition of the motor, and
a fourth section that, based on said current command, controls the output of said inverter circuit; and a current detecting section that detects a magnitude of output current from said battery, said unloaded voltage estimation section estimating said unloaded voltage, based on the detected output voltage from said voltage detecting section and the detected output current from said current detecting section, wherein said unloaded voltage estimating section is configured to carry out:

deriving a voltage which is detected by said voltage detecting section when the current detected by said current detecting section becomes zero; and deciding the derived voltage as said unloaded voltage.

8. A control system of an electric motor powered by a battery, comprising:

an inverter circuit that inverts a direct current fed from said battery to an alternating current fed to said electric motor; and an output controlling circuit that controls an output of said inverter circuit to adjust operation of said electric motor, said output controlling circuit including:
- a voltage detecting section that detects a magnitude of an output voltage of said battery;
- an unloaded voltage estimation section that, based on the detected output voltage, estimates an unloaded voltage that would be outputted from said battery when said battery is unloaded;
- a position sensor that detects an angular position and a rotation speed of a rotor of said motor;
- a current sensor that detects a condition of current outputted from said inverter circuit;
- a host controller that issues a torque command;
- a map storing section that stores a plurality of maps for various unloaded voltages, each map showing a relationship between the torque command, the rotation speed of the electric motor and a current command, said map storing section issuing a corresponding current command when receiving the unloaded voltage from said unloaded voltage estimation section; and
- a current control section that controls the output of said inverter circuit in accordance with the corresponding current command from said map storing section, the detected angular position and rotation speed of the rotor of said electric motor from said position sensor and the detected condition of current from said current sensor.

9. In a control system of controlling an electric motor powered by a battery, said control system including an inverter circuit that inverts a direct current fed from said battery to an alternating current fed to said electric motor, a method for controlling an output of said inverter circuit, comprising:
- detecting a magnitude of output voltage of said battery;
- deriving an unloaded voltage of said battery based on the detected output voltage, said unloaded voltage being a voltage which would be outputted from said battery when said battery is unloaded;
- looking up an appropriate current command from maps based on said unloaded voltage, said maps storing various current commands with respect to operation condition of the motor; and
- controlling the output of said inverter circuit based on the looked up current command.

* * * * *